United States Patent
Roosdorp et al.

(10) Patent No.: US 10,727,470 B2
(45) Date of Patent: Jul. 28, 2020

(54) QUICK CONNECTION BATTERY TERMINAL

(71) Applicant: TYCO ELECTRONICS BRASIL LTDA., Sao Paulo (BR)

(72) Inventors: Joannes Willem Maria Roosdorp, Braganca Paulista/Sao Paulo (BR); Fabio Fortunato Christiano, Itapira-SP (BR)

(73) Assignee: TYCO ELECTRONICS BRASIL LTDA., Sao Paulo (BR)

( * ) Notice: Subject to any disclaimer, the term of this patent is extended or adjusted under 35 U.S.C. 154(b) by 393 days.

(21) Appl. No.: 14/991,195

(22) Filed: Jan. 8, 2016

(65) Prior Publication Data
US 2016/0204412 A1 Jul. 14, 2016

Related U.S. Application Data

(60) Provisional application No. 62/102,314, filed on Jan. 12, 2015.

(51) Int. Cl.
 *H01M 2/30* (2006.01)
 *H01M 2/20* (2006.01)

(52) U.S. Cl.
 CPC ......... *H01M 2/305* (2013.01); *H01M 2/206* (2013.01); *H01M 2220/20* (2013.01)

(58) Field of Classification Search
 None
 See application file for complete search history.

(56) References Cited

U.S. PATENT DOCUMENTS

| | | | | |
|---|---|---|---|---|
| 5,087,214 A * | 2/1992 | Dewar | ................ | H01R 11/282 29/862 |
| 5,316,505 A * | 5/1994 | Kipp | ................... | H01R 11/282 439/762 |
| 5,389,466 A * | 2/1995 | Inoue | .................. | H01R 11/282 429/178 |
| 5,595,510 A * | 1/1997 | Obligar | ............... | H01R 11/282 439/761 |
| 6,971,925 B1 | 12/2005 | Orange | | |
| 7,166,001 B2 * | 1/2007 | Detter | ................ | H01R 11/283 439/762 |
| 7,303,448 B1 | 12/2007 | Sproesser | | |
| 7,350,424 B2 | 4/2008 | Hjelt et al. | | |
| 7,374,464 B1 * | 5/2008 | Vicenza | .............. | H01R 11/282 439/769 |
| 7,749,031 B2 * | 7/2010 | Detter | ................ | H01R 11/282 439/772 |

* cited by examiner

*Primary Examiner* — Amanda J Barrow (57) ABSTRACT

A battery terminal having a post-engaging portion configured to receive a battery post. The post-engaging portion has an arcuate portion having a first portion, a second portion and a slot separating the first portion from the second portion. Wherein in response to the lever being moved toward a closed position, the first portion and second portion are subjected to a tensile force, causing the first portion and the second portion to elongate while not exceeding the yield strength of the first portion and the second portion generating stored energy in the first portion and the second portion. The stored energy results in a constant normal force being applied by the first portion and the second portion of to the battery post to provide and maintain a gastight electrical contact interface between the first portion and the second portion and the battery post.

15 Claims, 4 Drawing Sheets

QUICK CONNECTION BATTERY TERMINAL

FIELD OF THE INVENTION

The present invention relates to battery terminal connectors. More particularly, the invention relates to quick connect battery terminal connectors.

BACKGROUND OF THE INVENTION

Automobile engine compartments contain many components which substantially fill the compartment, making routine maintenance a challenge. One such component is the battery. Batteries typically are extremely heavy and have fixed positive and negative charged locations, often in the form of exterior extending posts for interconnection with corresponding connectors, usually referred to as battery terminals. Conventional battery terminals typically include threaded fasteners that must be actuated to draw the battery terminal into engagement with the corresponding battery post. Typically, a corresponding electrical cable is crimped onto each battery terminal representing an in-line orientation which may or may not be the most convenient orientation for engaging the battery post.

These conventional battery terminal connectors have a disadvantage in that tools must be used to effectively tighten and loosen the bolt. Assembly of the battery terminal connector is therefore time consuming and complicated, especially if the terminal and/or the battery is not conveniently located. Because the entire battery terminal connector is generally formed of a conductive material, there is a risk of accidental shock or short circuiting during the assembly and disassembly thereof. Additionally, these conventional battery terminal connectors do not provide an easy or reliable method for attachment of an electrical cable thereto.

The use of such convention battery terminal connectors is problematic in many instances, as additional labor and expense is needed to ensure proper termination. For example, when car manufacturer's export vehicles overseas, the batteries must be disconnected when the car is transported onboard the ship and reconnected when the car arrives at port. As convention battery terminal connectors require the use of tooling for disconnection and connection to the battery, significant labor and expense is required.

To address some of these concerns, battery terminals which do not require tools for assembly have been developed. An example of such a known battery terminal is disclosed by Orange in U.S. Pat. No. 6,971,925 entitled Rotatable Connector for a Battery Cable Clamp. That battery clamp is disclosed as having first and second legs extending from a post section. A connecting pin passes through apertures formed in each leg such that it is coupled to a handle on one end and an end nut on an opposite end thereof. The connecting pin also passes through a seat upon which a boss of the handle rests during rotation to facilitate a clamping action between the legs. On a rear end of the clamp, a cable joining section is provided as a threaded post which is secured to a flat plate. Although the design disclosed in this reference presents a desirable tool-less clamping operation, it has several drawbacks in that a seat is required to facilitate clamping and also presents a drawback in that the flat plate for supporting the threaded post may bend or otherwise break away from the remainder of the assembly. Additionally, the design disclosed in this reference requires many individual parts, which makes the design more costly and difficult to assemble.

Another example is disclosed in U.S. Pat. No. 7,303,448 which discloses a battery terminal connector having a main body including a clamp having first and second flanges extending from ends thereof and a terminal receiving member extending from the first flange. A lever is removeably attached to the first and second flanges by a threaded shaft and a knurled nut. The lever is connected to the threaded shaft by an eyelet and is rotatable between an open position and a closed position. The lever pulls the first and second flanges toward each other in the closed position. A ring terminal has a ring connected to the terminal receiving member.

In contrast, U.S. Pat. No. 7,374,464 discloses a battery terminal including a base configured to selectably engage a terminal tongue. A post-engaging portion is configured to receive a battery post, one end of the post-engaging portion extending contiguously from the base. An opposite end of the post-engaging portion terminates at a nonplanar member adjacent to the base. A lever-holding portion extends from the base toward the nonplanar member. A lever is pivotably connected to the lever-holding portion about an axis, the lever having a cam-shaped portion. In response to pivotal motion of the lever toward a closed position, the cam-shaped portion is urged into contact with the nonplanar member, the nonplanar member pivoting about an end along the base to resiliently draw the post-engaging portion into a gripping arrangement for engagement with the battery post. However, such a battery terminal has a concentration of forces located in the transition area which can cause ineffective electrical contact over the life of the battery terminal.

What is needed is a battery terminal that can be easily connected and disconnected to a battery post and which provides a distribution of forces over the terminal to ensure for a gastight electrical connection between the terminal and the post over the life of terminal.

SUMMARY OF THE INVENTION

An embodiment is directed to a battery terminal which includes a base, a post engaging portion, a lever-holding portion and a lever. The post-engaging portion is configured to receive a battery post. One end of the post-engaging portion extends contiguously from the base, with an opposite end of the post-engaging portion terminating at a nonplanar member adjacent to the base. The post-engaging portion has an arcuate portion having a first portion, a second portion and a slot separating the first portion from the second portion. The lever-holding portion extends from the base toward the nonplanar member. The lever is pivotably connected to the lever-holding portion. Wherein in response to the lever being moved toward a closed position, the first portion and second portion of the arcuate portion are subjected to a tensile force, causing the first portion and the second portion to elongate while not exceeding the yield strength of the first portion and the second portion generating stored energy in the first portion and the second portion. The stored energy results in a constant normal force being applied by the first portion and the second portion of the arcuate portion to the batter post to provide and maintain a gastight electrical contact interface between the first portion and the second portion of the arcuate portion and the battery post.

An embodiment is directed to a battery terminal which includes a base, a post engaging portion, a lever-holding portion and a lever. The post-engaging portion is configured to receive a battery post. One end of the post-engaging portion extends contiguously from the base, with an opposite end of the post-engaging portion terminating at a nonplanar member adjacent to the base. The post-engaging portion has a base engagement portion which extends from base, a nonplanar engagement portion which extends from the nonplanar member and an arcuate portion having an elastically deformable first portion, an elastically deformable second portion and a slot separating the first portion from the second portion. The lever-holding portion extends from the base toward the nonplanar member. The lever is pivotably connected to the lever-holding portion. The lever has a cam-shaped portion. In response to the lever being moved toward a closed position, the elastically deformable first portion and the elastically deformable second portion of the arcuate portion are subjected to a tensile force, causing the elastically deformable first portion and the elastically deformable second portion to elongate while not exceeding the yield strength of the elastically deformable first portion and the elastically deformable second portion generating stored energy in the elastically deformable first portion and the elastically deformable second portion. The stored energy results in a constant normal force being applied by the elastically deformable first portion and the elastically deformable second portion of the arcuate portion to the battery post to provide and maintain a gastight electrical contact interface between the elastically deformable first portion and the elastically deformable second portion of the arcuate portion and the battery post.

An embodiment is directed to a battery terminal which includes a base, a post engaging portion, a lever-holding portion and a lever. The post-engaging portion is configured to receive a battery post. A base engagement portion of the post-engaging portion extends from the base. An opposite end of the post-engaging portion terminates at a nonplanar member adjacent to the base. The post-engaging portion includes an arcuate portion with an elastically deformable first portion, an elastically deformable second portion and a slot separating the first portion from the second portion. The first portion and the second portion of the arcuate portion are more elastic than the base engagement portion. A bridge member is positioned in the slot and extends between the first portion and the second portion. The bridge member has a projection which extends inward from the bridge member. The lever-holding portion extends from the base toward the nonplanar member. The lever is pivotably connected to the lever-holding portion. The lever is movable between an open and a closed position. Wherein the resulting stresses created by the activation of the lever toward the closed position are distributed proportionately more to the first portion and the second portion of the arcuate portion than to the stiffer base engagement portion, resulting in stored energy created in the first portion and the second portion of the arcuate portion, thereby ensuring that normal force applied by the first portion and the second portion of the arcuate portion on the post is maintained over the life of the battery terminal. Wherein as the lever is moved to the closed position, the engagement of the projection with the post causes the bridge member to deflect away from the post resulting in additional stored energy in the first portion and the second portion of the arcuate portion to maintain the gastight electrical connection between the first portion and the second portion of the arcuate portion and the battery post.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

FIGS. 1 through 10 illustrate an embodiment of a battery terminal 10 for use with providing an electrical connection or engagement with a battery post 16 of a battery (not shown). The electrical connection can be effected without a special tool. The battery terminal obtains maximum elongation toward its yield strength, as will be more fully described, to provide and maintain a gastight electrical connection between the battery terminal and the battery post over time.

The term battery post is intended to refer to a protrusion extending from a battery that corresponds to one of the charged, i.e., positive or negative, portions of the battery. In the illustrative embodiment shown, the battery post 16 resembles a cylindrical segment having an outside surface 13 (FIG. 7) such that when engaged with an inside surface 15 of a post-engaging portion 14 (FIG. 1) of the battery terminal 10, as discussed in additional detail below, an electrical connection is formed between the post-engaging portion and the battery post.

Figure 1:
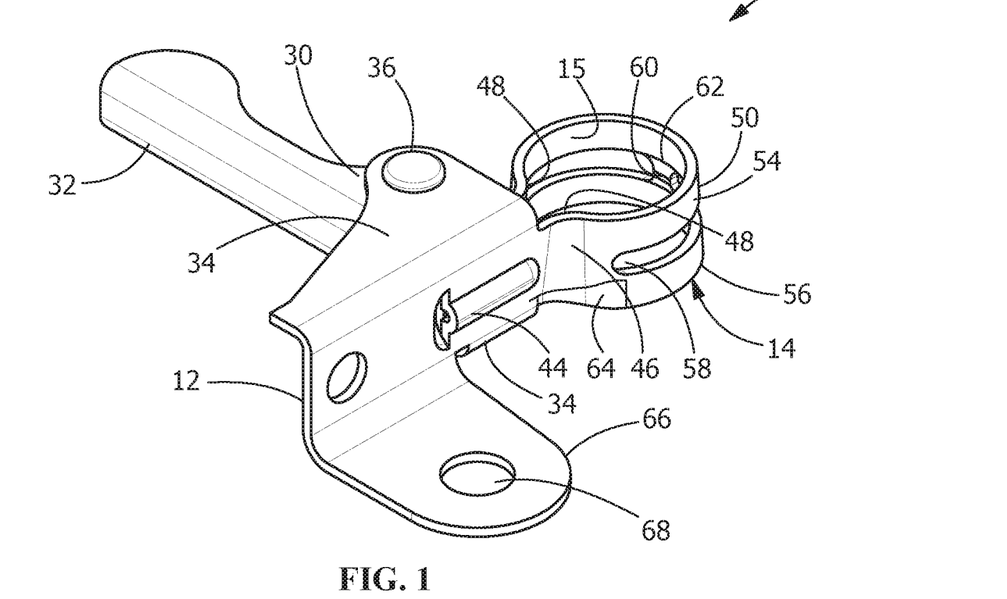
FIG. 1 is a top perspective view of an illustrative embodiment of a battery terminal of the present invention.
Figure 2:
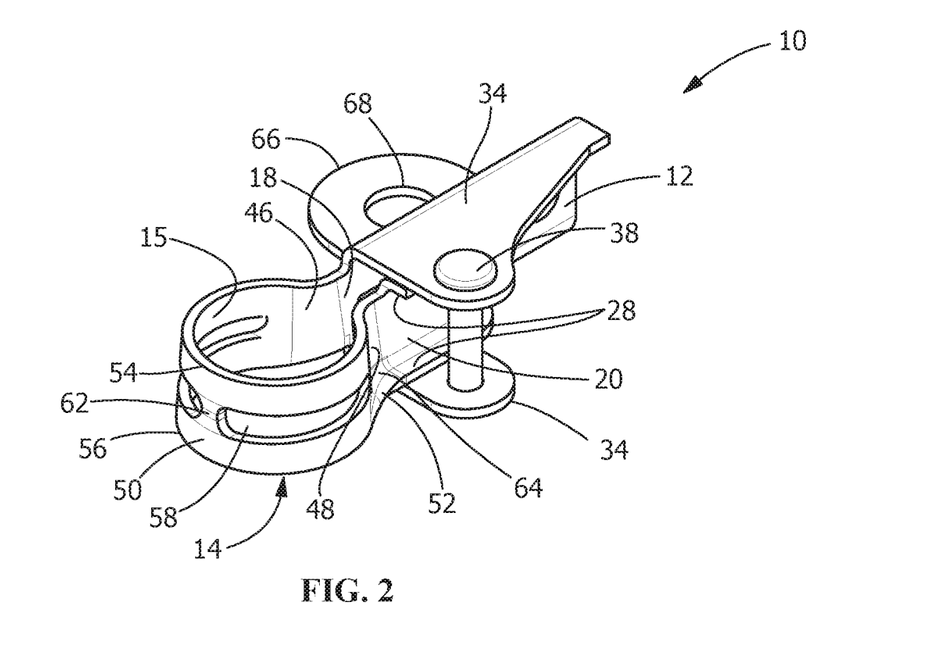
FIG. 2 is a top perspective view of the battery terminal shown in FIG. 1 with a lever removed.
Figure 3:
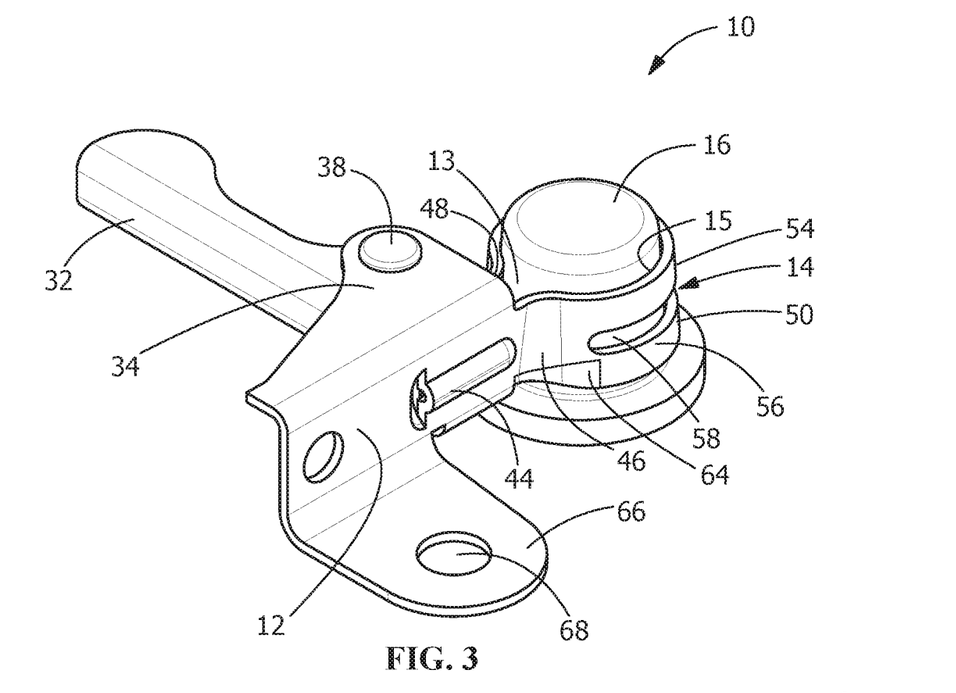
FIG. 3 is a top perspective view of the battery terminal shown in FIG. 1 rotated ninety degrees around a vertical axis and inserted onto a battery post in an open position.
Figure 4:
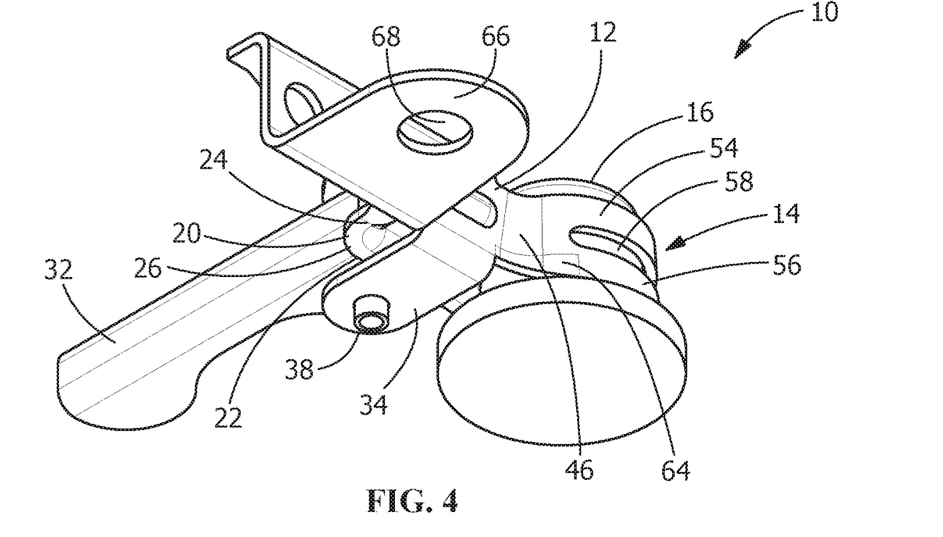
FIG. 4 is a bottom perspective view of the battery terminal shown in FIG. 3.
Figure 5:
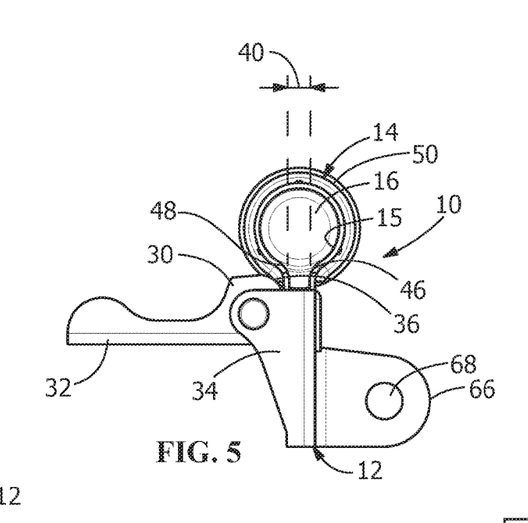
FIG. 5 is a top plan view of the battery terminal of FIG. 3.
Figure 6:
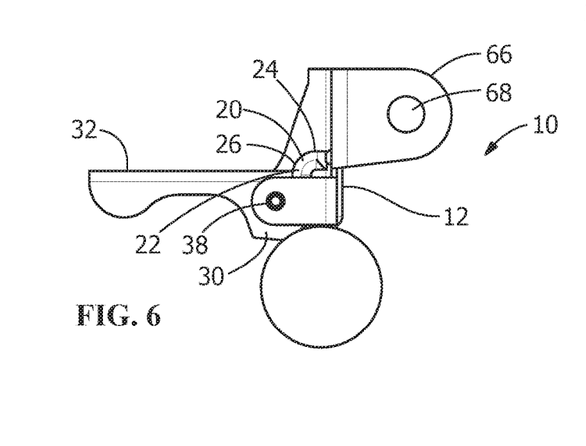
FIG. 6 is a bottom plan view of the battery terminal of FIG. 3.
Figure 7:
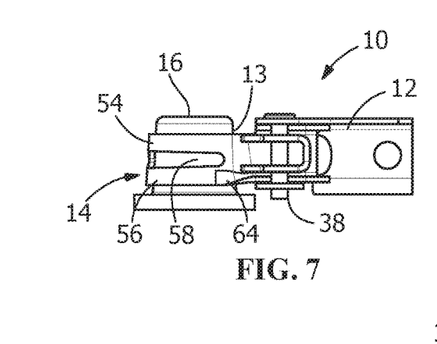
FIG. 7 is a partial front plan view of the battery terminal of FIG. 5.
Figure 8:
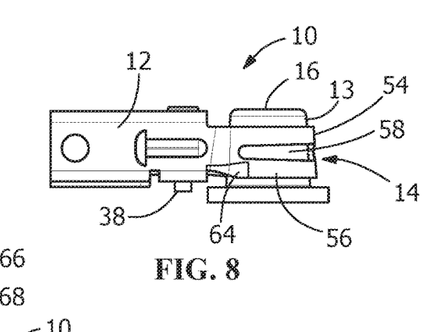
FIG. 8 is a partial back plan view of the battery terminal of FIG. 5.
Figure 9:
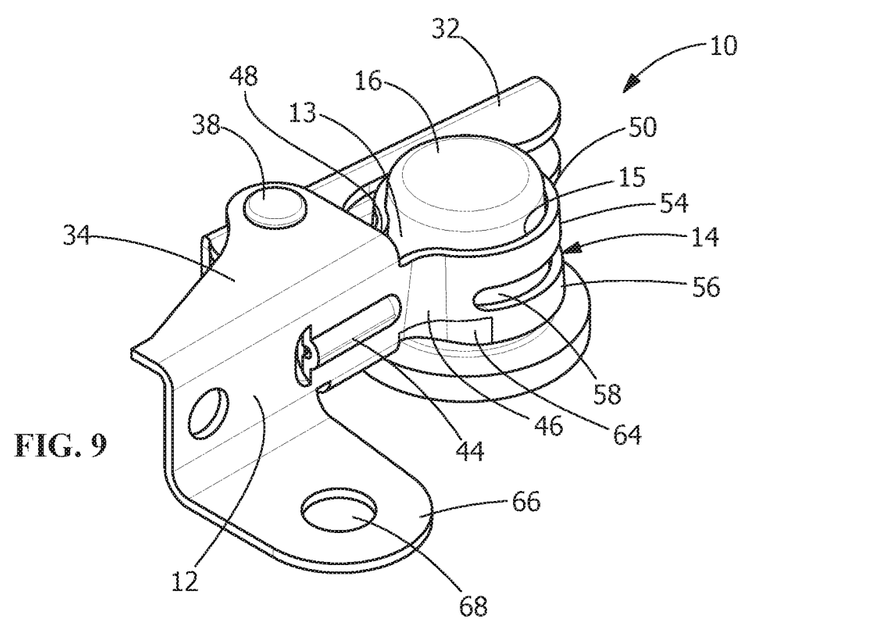
FIG. 9 is a top perspective view of the battery terminal shown in FIG. 3 shown in a closed position.

As best shown in FIGS. 1 through 4, battery terminal 10 includes a base 12 extending to post-engaging portion 14 having a closed geometry, such as an annular shape, for engaging a battery post 16. As shown in FIG. 5, one end or base engagement portion 46 of post-engaging portion 14 is integral to and extends from base 12. The opposite end or nonplanar member engagement portion 48 of post-engaging portion 14 terminates at a nonplanar member 20 (as best shown in FIG. 2) disposed adjacent to base 12. To ease installation over a battery post, post-engaging portion 14 includes a slightly tapered profile, and as shown in FIGS. 1 and 2. Nonplanar member 20 includes segment 22, which is generally parallel to base 12, and segment 24, which is generally perpendicular to base 12, (as best shown in FIGS. 4 and 6) disposed at an angle to each other, such as, but not limited to, 60 degrees to form a curved portion 26. Opposed flanges 28 (FIG. 2) of nonplanar member 20 provide nonplanar member 20 with substantial structural strength and stiffness. Nonplanar member 20 provides sufficient resilience for post-engaging portion 14 to selectably release the battery post in response to the lever 32 being actuated from a closed position (FIG. 3) to an open position (FIG. 9).

It is to be understood that components of the battery terminal are of sufficient structural strength and electrical conductivity to effect an electrical connection when engaged with a battery post, such as metal, including, but not limited to, brass or steel. Although the component material is typically electrically conductive, electrically conductive coatings, such as tin or other materials, may also be used.

Figure 10:
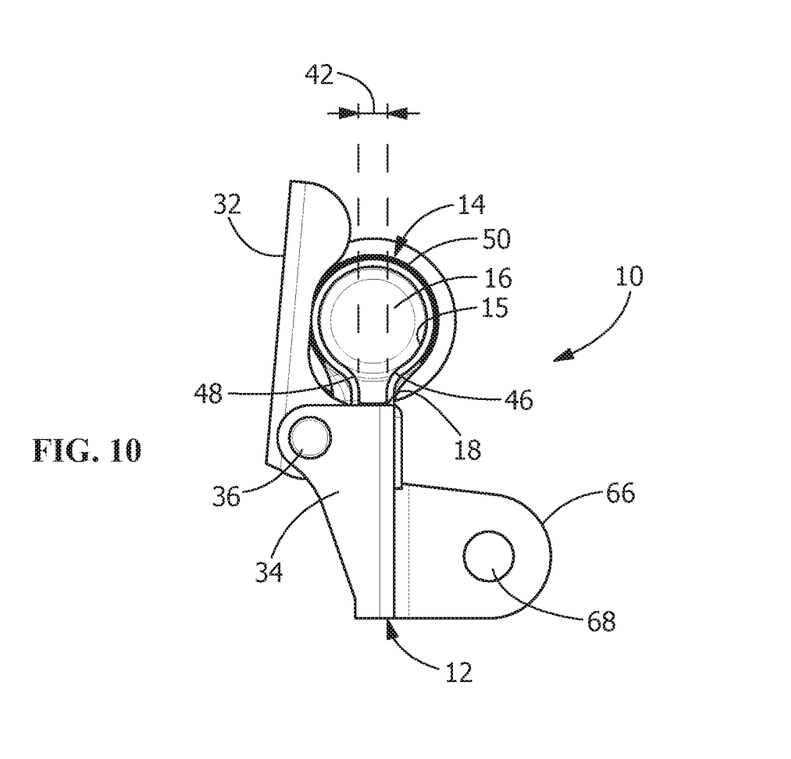
FIG. 10 is a top plan view of the battery terminal of FIG. 9.

Base 12 further includes a lever-holding portion 34, such as opposed tabs. The lever 32 is pivotably connected by pin 38 to the lever-holding portion 34, thereby allowing lever 32 to rotate about the axis of pin 38. FIGS. 1, 3 and 5 show battery terminal 10 in an open position, or prior to engagement with a battery post, and FIGS. 9 and 10 show battery terminal 10 in a closed position, or after engagement with a battery post. In the open position as shown in FIG. 5, a distance 40 separates base 12 from an adjacent surface of nonplanar member 20, with lever 32 disposed substantially perpendicular to base 12. To achieve the closed position as shown in FIG. 10, lever 32 is pivotably rotated about the axis of pin 38 toward post-engaging portion 14, typically until lever 32 abuts post-engaging portion 14. During rotation of lever 32, a cam-shaped portion 36 of lever 32 contacts nonplanar member 20 and increasingly urges nonplanar member 20 to move with respect to base 12, causing segment 24 to engaged the base 12. In one embodiment, flanges 28 (FIG. 2) provide substantial rigidity to nonplanar member 20, such that in response to abutting contact with cam-shaped portion 32, nonplanar member 20 is substantially rigid. With the segment 24 prevented from further movement relative to base 12, the end of nonplanar member 20 which is in contact with the post-engaging portion 14 pivots along base 12, reducing distance 40 (FIG. 3) to distance 42 (FIG. 10) to draw post-engaging portion 14 into engagement with the battery post, as will be more fully described. In one embodiment, nonplanar member 20 is substantially rigid due to the opposed flanges 28, which defines a C-shape having significant structural rigidity. Alternately, nonplanar member 20 may have increased thickness, as compared to post-engaging portion 14, or contain an embossed region or regions similar to embossed region 44 (see FIG. 1) to achieve increased rigidity as compared to the post-engaging portion.

In one embodiment, nonplanar member 20 enhances resilient behavior of post-engaging portion 14 in response to lever 32 being pivotably actuated from the closed position to the open position. That is, in response to cam-shaped portion 36 being actuated to provide a reduced or decreased degree of abutting contact with nonplanar member 20, nonplanar member 20 pivots along base 12 to substantially return from distance 42 toward distance 40, or sufficiently loosening post-engaging portion 14 so that the battery terminal may be disengaged from a battery post. Stated another way, nonplanar member 20 permits automatic loosening of post-engaging portion 14 in response to pivotably actuating lever 32 from the closed position to the open position without further manipulation of post-engaging portion 14.

The post-engaging portion 14 has a base engagement portion 46, a nonplanar member engagement portion 48, and an arcuate portion 50 which extends between the base engagement portion 46 and the nonplanar member engagement portion 48.

The nonplanar member engagement portion 48 extends from an end of the nonplanar member 20 opposite the end which includes the segments 22, 24. As best shown in FIG. 2, a stiffening member, rib or flange 52 is positioned on the nonplanar member engagement portion 48. In the illustrative embodiment shown, the flange 52 is disposed on one side of the nonplanar member engagement portion 48. However, other configurations of the flange 52 may be used without departing from the scope of the invention. For example, flanges may be positioned on either side of the nonplanar member engagement portion 48. Flange 52 provides nonplanar member engagement portion 48 with substantial structural strength and stiffness, which assists with engaging a battery post. In the illustrative embodiment shown, the flange 52 is positioned on the nonplanar member engagement portion 48 and extends from the nonplanar member 20 to the arcuate portion 50. However, the length and positioning of the flange 52 may vary depending upon the strength and rigidity characteristics desired. Nonplanar member engagement portion 48 provides sufficient resilience for post-engaging portion 14 to allow the post-engaging portion 14 to properly engage and maintain an electrical connection which is impervious to gas or gastight between the post and the post-engaging portion 14 over the life to the battery terminal 10.

The arcuate portion 50 has an upper or first portion 54, a lower or second portion 56 and an elongated slot or circumferentially extending slot 58 which extends from proximate the base engagement portion 46 to proximate the nonplanar engagement portion 48. The circumferentially extending slot 58 is positioned between the upper portion 54 and the lower portion 56. An extended or bridge member 62 (FIGS. 1 and 2) is positioned in the circumferentially extending slot 58 and extends from the lower portion 56 toward the upper portion 54.

While the bridge member 62 may have different configuration without departing from the scope of the invention, the bridge member 62 in the illustrative embodiment includes a dimple or projection 60 which extends inward from the bridge member 62. The projection 60 cooperates with the post to partially pierce into the post when the post-engaging portion 14 is mated to the post, as will be more fully described.

The base engagement portion 46 extends from an end of the base 12 proximate the lever-holding portion 34. In various embodiments, a stiffening member, rib or flange 64 is positioned on the base engagement portion 46. In the illustrative embodiment shown, the flange 64 is disposed on one side of the base engagement portion 46. However, other configurations of the flange 64 may be used without departing from the scope of the invention. For example, flanges may be positioned on either side of the base engagement portion 46. Flange 64 provides base engagement portion 46 with substantial structural strength and stiffness, which assists with engaging a battery post. In the illustrative embodiment shown, the flange 64 extends from the base engagement portion 46 to the arcuate portion 50. However, the length and positioning of the flange 64 may vary depending upon the strength and rigidity characteristics desired. Base engagement portion 46 provides sufficient resilience for post-engaging portion 14 to allow the post-engaging portion 14 to properly engage and maintain a gastight electrical connection between the post and the post-engaging portion 14 over the life to the battery terminal 10.

As previously stated, the configuration of the post-engaging portion 14 allows for the post-engaging portion 14 to properly engage and maintain a gastight electrical connection between the post and the post-engaging portion 14 over the life to the battery terminal 10. Due to the configuration of the elastically deformable upper portion 54 and the elastically deformable lower portion 56 of the arcuate portion 50 the resulting stresses created by the activation of the lever 32 from the open position to the closed position will be distributed proportionately more to the elastically deformable upper portion 54 and lower portion 56 of the arcuate portion 50 than to the base engagement portion 46 or the nonplanar member engagement portion 48.

As the lever 32 is moved from open position to the closed position, the post-engaging portion 14 is subjected to a tensile force, as the diameter of the post-engaging portion 14 cannot be reduced beyond the diameter of the solid battery post 16. The elongated slot 58 is dimensioned to allow the elastically deformable upper portion 54 and the elastically deformable lower portion 56 to deform independently, thereby allowing the elastically deformable upper portion 54 and the elastically deformable lower portion 56 to have maximum elongation while not exceeding the yield strength of the material of the upper portion 54 and the lower portion 56 when the lever 32 is moved to the closed position. Therefore, as the lever 32 is moved to the closed position, the upper portion 54 and the lower portion 56 of the arcuate portion 50 will be elongated. This elongation of the upper portion 54 and the lower portion 56 of the arcuate portion 50 generates stored energy in the upper portion 54 and the lower portion 56 which translates into a constant normal force being applied by the upper portion 54 and the lower portion 56 of the arcuate portion 50 to the post 16, thereby providing a gastight electrical contact interface between the upper portion 54 and the lower portion 56 of the arcuate portion 50 and the post 16. As the elongation force applied to the upper portion 54 and the lower portion 56 of the arcuate portion 50 maintains the upper portion 54 and the lower portion 56 of the arcuate portion 50 within their yield strength, the normal force will not relax and the gastight electrical contact between the upper portion 54 and the lower portion 56 of the arcuate portion 50 and the post 16 will be maintained over the required life cycle of the battery terminal 10.

The connection between the arcuate portion 50 and the post is enhanced by the engagement of the projection 60 of the bridge member 62 with the post. As the lever 32 is moved to the closed position, the movement of the elastically deformable upper portion 54 and the elastically deformable lower portion 56, as described above, causes the projection 60 to engage with the post, which causes the projection 60 to partially pierce into the post 16. In addition, as the lever 32 is moved to the closed position, the interaction of the projection 60 with the post 16 causes the bridge member 62 to deflect away from the post, thereby maintaining the battery terminal 10 in position as the torque needed to rotate the battery terminal 10 once the lever is moved to the closed position is increased. The results in additional stored energy to maintain the gastight electrical connection over time. In addition, the engagement of the projection 62 with the post 16 prevents rotation of the terminal 10 after the lever 32 has been moved to the closed position.

In the illustrative embodiment shown, the battery terminal 10 has a tongue 66 to mate with the mating terminal tongue of a mating connector. The tongue 66 includes an aperture 68 formed therein to receive a protruding component, such as a pin or a fastening member. Alternately, a feature, such as a slot (not shown), can be formed in the tongue or other feature that similarly provides an electrical and mechanical connection between the tongue and the battery terminal.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A battery terminal comprising:
a base;
a post-engaging portion configured to receive a battery post, one end of the post-engaging portion extending from the base, an opposite end of the post-engaging portion terminating at a nonplanar member adjacent to the base, the post-engaging portion having an arcuate portion having an elastically deformable first portion, an elastically deformable second portion and a circumferentially extending slot separating the elastically deformable first portion from the elastically deformable second portion;

a lever-holding portion extending from the base toward the nonplanar member;

a lever pivotably connected to the lever-holding portion;

a deflectable bridge member positioned in the slot and extending between the elastically deformable first portion and the elastically deformable second portion, the deflectable bridge member having a piercing projection which extends inward from the deflectable bridge member, the piercing projection engages with the battery post when the lever is moved toward a closed position;

wherein in response to the lever being moved toward the closed position, the elastically deformable first portion and the elastically deformable second portion of the arcuate portion are subjected to a tensile force, causing the elastically deformable first portion and the elastically deformable second portion to elongate while not exceeding the yield strength of the elastically deformable first portion and the elastically deformable second portion and generating stored energy in the elastically deformable first portion and the elastically deformable second portion, wherein the stored energy results in a constant normal force being applied by the elastically deformable first portion and the elastically deformable second portion of the arcuate portion to the battery post to provide and maintain a gastight electrical contact interface between the elastically deformable first portion and the elastically deformable second portion of the arcuate portion and the battery post;

wherein as the lever is moved to the closed position, the deflectable bridge member is configured to deflect away from the battery post and the piercing projection is configured to pierce the post, increasing the torque needed to rotate the battery terminal once the lever is moved to the closed position, resulting in additional stored energy in the arcuate portion to maintain the gastight electrical contact interface over time.

2. The battery terminal of claim 1, wherein the post-engaging portion includes a base engagement portion which extends from the base and a nonplanar engagement portion which extends from the nonplanar member.

3. The battery terminal of claim 2, wherein the arcuate portion extends between the base engagement portion and the nonplanar engagement portion.

4. The battery terminal of claim 2, wherein a stiffening member is positioned on the nonplanar engagement portion, the stiffening member provides the nonplanar engagement portion with structural strength and stiffness.

5. The battery terminal of claim 4, wherein the stiffening member is disposed on one side of the nonplanar engagement portion.

6. The battery terminal of claim 4, wherein the stiffening member is disposed on two sides of the nonplanar engagement portion.

7. The battery terminal of claim 4, wherein the stiffening member extends from the nonplanar engagement portion to the arcuate portion.

8. The battery terminal of claim 2, wherein a stiffening member is positioned on the post-engaging portion, the stiffening member provides the post-engaging portion with structural strength and stiffness.

9. The battery terminal of claim 8, wherein the stiffening member is disposed on one side of the post-engaging portion.

10. The battery terminal of claim 8, wherein the stiffening member is disposed on two sides of the post-engaging portion.

11. The battery terminal of claim 8, wherein the stiffening member extends from the post-engaging portion to the arcuate portion.

12. The battery terminal of claim 2, wherein the elastically deformable first portion and the elastically deformable second portion of the arcuate portion are maintained with their yield strength, whereby the resulting stresses created by the activation of the lever from the open position to the closed position will be distributed proportionately more to the elastically deformable first portion and the elastically deformable second portion than to the base engagement portion or the nonplanar engagement portion.

13. A battery terminal comprising:

a base;

a post-engaging portion configured to receive a battery post, one end of the post-engaging portion extending from the base, an opposite end of the post-engaging portion terminating at a nonplanar member adjacent to the base, the post-engaging portion having a base engagement portion which extends from the base, a nonplanar engagement portion which extends from the nonplanar member, and an arcuate portion having an elastically deformable first portion, an elastically deformable second portion and a circumferentially extending slot separating the elastically deformable first portion from the elastically deformable second portion;

a lever-holding portion extending from the base toward the nonplanar member;

a lever pivotably connected to the lever-holding portion about an axis, the lever having a cam-shaped portion;

a deflectable bridge member positioned in the slot and extending between the elastically deformable first portion and the elastically deformable second portion, the deflectable bridge member having a piercing projection which extends inward from the deflectable bridge member, the piercing projection engaging with the battery post when the lever is moved toward a closed position;

wherein in response to the lever being moved toward the closed position, the elastically deformable first portion and the elastically deformable second portion of the arcuate portion are subjected to a tensile force, causing the elastically deformable first portion and the elastically deformable second portion to elongate while not exceeding the yield strength of the elastically deformable first portion and the elastically deformable second portion and generating stored energy in the elastically deformable first portion and the elastically deformable second portion, wherein the stored energy results in a constant normal force being applied by the elastically deformable first portion and the elastically deformable second portion of the arcuate portion to the battery post to provide and maintain a gastight electrical contact interface between the elastically deformable first portion and the elastically deformable second portion of the arcuate portion and the battery post;

wherein as the lever is moved to the closed position, the deflectable bridge member is configured to deflect away from the battery post and the piercing projection is configured to pierce the post, increasing the torque needed to rotate the battery terminal once the lever is moved to the closed position, resulting in additional stored energy in the arcuate portion to maintain the gastight electrical contact interface over time.

14. The battery terminal of claim 13, wherein a first stiffening member is positioned on the nonplanar engagement portion, the first stiffening member provides the non-planar engagement portion with structural strength and stiffness.

15. The battery terminal of claim 14, wherein a second stiffening member is positioned on the post-engaging portion, the second stiffening member provides the post-engaging portion with structural strength and stiffness.

* * * * *